(12) United States Patent
Christie et al.

(10) Patent No.: US 11,526,175 B1
(45) Date of Patent: *Dec. 13, 2022

(54) SENSOR DATA PRIORITIZATION FOR AUTONOMOUS VEHICLE BASED ON VEHICLE OPERATION DATA

(71) Applicant: Aurora Operations, Inc., Mountain View, CA (US)

(72) Inventors: Cameron David Christie, San Francisco, CA (US); Anuranga Sajith Gunaratne, San Francisco, CA (US)

(73) Assignee: AURORA OPERATIONS, INC., Mountain View, CA (US)

( * ) Notice: Subject to any disclaimer, the term of this patent is extended or adjusted under 35 U.S.C. 154(b) by 135 days.

This patent is subject to a terminal disclaimer.

(21) Appl. No.: 16/588,996

(22) Filed: Sep. 30, 2019

(51) Int. Cl.
*G05D 1/02* (2020.01)
*B60W 30/18* (2012.01)
*G05D 1/00* (2006.01)
*B60W 40/105* (2012.01)
*G06V 20/56* (2022.01)

(52) U.S. Cl.
CPC ..... *G05D 1/0223* (2013.01); *B60W 30/18036* (2013.01); *B60W 40/105* (2013.01); *G05D 1/0088* (2013.01); *G06V 20/56* (2022.01); *B60W 2554/00* (2020.02); *G05D 2201/0213* (2013.01)

(58) Field of Classification Search
CPC ......... B60W 40/105; B60W 30/18036; B60W 2554/00; G05D 2201/0213; G05D 1/0223; G05D 1/0088; G06K 9/00791; G06V 20/56
See application file for complete search history.

(56) References Cited

U.S. PATENT DOCUMENTS

| 2013/0088578 | A1* | 4/2013 | Umezawa | G06K 9/00805 348/47 |
| 2014/0303866 | A1* | 10/2014 | Roblin | B60T 7/22 701/70 |
| 2017/0222831 | A1 | 8/2017 | Zirkler | |
| 2017/0372149 | A1 | 12/2017 | Mori | |
| 2018/0050699 | A1 | 2/2018 | Gauthier | |
| 2018/0188027 | A1* | 7/2018 | Zhang | G01C 11/12 |
| 2018/0257643 | A1* | 9/2018 | Kroop | B60W 30/09 |
| 2018/0261020 | A1* | 9/2018 | Petousis | G07C 5/0841 |
| 2019/0082016 | A1 | 3/2019 | Sasaki | |
| 2019/0122386 | A1* | 4/2019 | Wheeler | H04N 13/106 |
| 2019/0137601 | A1 | 5/2019 | Driscoll et al. | |
| 2019/0154842 | A1* | 5/2019 | Adachi | G01S 19/45 |
| 2019/0271559 | A1* | 9/2019 | Colgate | G01C 21/3638 |
| 2019/0273909 | A1 | 9/2019 | Ye et al. | |

(Continued)

OTHER PUBLICATIONS

U.S. Appl. No. 16/588,971, unpublished, Cameron David Christie.

(Continued)

*Primary Examiner* — Behrang Badii

(74) *Attorney, Agent, or Firm* — Freestone Intellectual Property Law PLLC; Aaron J. Visbeek; Andrew J. Cameron

(57) ABSTRACT

Sensor data is received from an array of sensors configured to capture one or more objects of an external environment of an autonomous vehicle. A first sensor group is selected from the array of sensors based on vehicle operation data representative of a state of the autonomous vehicle. First sensor data from the first group is prioritized for transmission based on the vehicle operation data.

20 Claims, 8 Drawing Sheets

(56) References Cited

U.S. PATENT DOCUMENTS

2020/0201325 A1* 6/2020 Parekh ................. G05D 1/0088
2020/0356091 A1* 11/2020 Nagarajan ............ G05D 1/0257
2021/0006344 A1 1/2021 Chen et al.

OTHER PUBLICATIONS

Samii, S., "Level 5 by Layer 2: Time-Sensitive Networking for Autonomous Vehicles," in IEEE Communications Standards Magazine, Jun. 2018.

Wikipedia Contributors. "Time-Sensitive Networking." Wikipedia, The Free Encyclopedia, Nov. 30, 2019. Web. Dec. 17, 2019.

Lee, J., Time-Sensitive Network (TSN) Experiment in Sensor-Based Integrated Environment for Autonomous Driving. Sensors Mar. 2019.

Buechel, M., "An Automated Electric Vehicle Prototype Showing New Trends in Automotive Architectures," 2015 IEEE, Las Palmas.

Non-Final Office Action, U.S. Appl. No. 16/588,971, Notification dated Jun. 28, 2021, 19 pages.

Final Office Action, U.S. Appl. No. 16/588,971, Notification dated Dec. 6, 2021, 17 pages.

Non-Final Office Action, U.S. Appl. No. 16/588,971, Notification dated May 18, 2022, 29 pages.

* cited by examiner

SENSOR DATA PRIORITIZATION FOR AUTONOMOUS VEHICLE BASED ON VEHICLE OPERATION DATA

TECHNICAL FIELD

This disclosure relates generally to autonomous vehicles and in particular to sensor data prioritization for autonomous vehicles.

BACKGROUND INFORMATION

The automobile industry is currently developing autonomous features for controlling vehicles under certain circumstances. According to SAE International standard J3016, there are 6 levels of autonomy ranging from Level 0 (no autonomy) up to Level 5 (vehicle capable of operation without operator input in all conditions). A vehicle with autonomous features utilizes sensors to sense the environment that the vehicle navigates through. Acquiring and processing data from the sensors allows the vehicle to safely navigate through its environment.

BRIEF SUMMARY OF THE INVENTION

In an implementation of the disclosure, an autonomous vehicle includes an array of sensors, processing logic, and a switch such as a time sensitive network switch. The array of sensors is configured to capture one or more objects in an external environment of the autonomous vehicle and generate sensor data related to the external environment. The processing logic is configured to receive the sensor data and generate an external environment representation based on the sensor data. The switch is configured to receive the sensor data from the array of sensors. The switch may include a prioritization engine and an output communication port. The prioritization engine is configured to prioritize a transmission of first sensor data from a first sensor group of the array of sensors over transmission of second sensor data from a second sensor group of the array of sensors. The first sensor data and the second sensor data are prioritized, in time, based on vehicle operation data received by the prioritization engine. The output communication port is configured to transmit the first sensor data to the processing logic prior to sending the second sensor data.

In an implementation, the array of sensors includes rear sensors disposed to detect or image a rear-ward area of the autonomous vehicle and front sensors disposed to detect or image a frontside area of the autonomous vehicle and the vehicle operation data indicates a rear-ward direction of the autonomous vehicle. The first sensor data is generated by the rear sensors and the second sensor data is generated by the front sensors. The switch may include an input port configured to receive the vehicle operation data from a vehicle bus of the autonomous vehicle and the vehicle operation data may include a reverse transmission state.

In an implementation, the array of sensors includes rear sensors disposed to detect or image a rear-ward area of the autonomous vehicle and front sensors disposed to detect or image a frontside area of the autonomous vehicle and the vehicle operation data indicates a forward direction of the autonomous vehicle. The first sensor data may be generated by the front sensors and the second sensor data is generated by the rear sensors. The switch may include an input port configured to receive the vehicle operation data from a vehicle bus of the autonomous vehicle and the vehicle operation data includes a forward-gear transmission state.

The vehicle operation data includes a speed of the autonomous vehicle, in some implementations. The array of sensors includes at least one of a Light Detection and Ranging (LIDAR) sensor, an ultrasonic sensor, a camera, or a Radar Detection and Ranging (RADAR) sensor, in some implementations.

In an implementation of the disclosure, a method of prioritizing data transfer in an autonomous vehicle includes receiving sensor data from an array of sensors configured to capture one or more objects of an external environment of the autonomous vehicle and receiving vehicle operation data representative of a vehicle state of the autonomous vehicle. The method also includes selecting a first sensor group of the array of sensors of the autonomous vehicle based on the vehicle operation data and based on selecting the first sensor group, prioritizing, by a switch, transmission of first sensor data from the first sensor group over transmission of second sensor data from a second sensor group of the array of sensors where the second sensor group is different from the first sensor group. In some implementations, the processing logic selects the first sensor group.

In an implementation, the transmission of the first sensor data and the second sensor data is from the switch to processing logic of the autonomous vehicle and the switch is configured to receive the first sensor data and the second sensor data from the array of sensors. The method may further include generating, with the processing logic, an external environment representation of the autonomous vehicle with the first sensor data and without the second sensor data. The method may also further include generating an updated external environment representation of the autonomous vehicle with the second sensor data and the updated external environment representation of the autonomous vehicle is generated subsequently to the external environment representation.

The vehicle state indicates a transmission gear of a transmission of the autonomous vehicle, in some implementations. The vehicle operation data may be received from a vehicle data bus of the autonomous vehicle.

In some implementations, the array of sensors includes rear sensors disposed to detect or image a rear-ward area of the autonomous vehicle and front sensors disposed to detect or image a frontside area of the autonomous vehicle. The vehicle operation data may indicate a rear-ward direction of the autonomous vehicle. The first sensor data may be generated by the rear sensors and the second sensor data may be generated by the front sensors.

In some implementations, the array of sensors includes rear sensors disposed to detect or image a rear-ward area of the autonomous vehicle and front sensors disposed to detect or image a frontside area of the autonomous vehicle and the vehicle operation data may indicate a forward direction of the autonomous vehicle. The first sensor data may be generated by the front sensors and the second sensor data may be generated by the rear sensors.

The vehicle operation data includes a speed of the autonomous vehicle, in some implementations. The array of sensors includes at least one of a LIDAR sensor or a RADAR sensor, in some implementations.

In an implementation of the disclosure, an autonomous vehicle includes processing logic, and a switch such as a time sensitive network switch. The processing logic is configured to receive sensor data and generate an external environment representation based on the sensor data and the sensor data is received from an array of sensors configured to capture one or more objects in an external environment of the autonomous vehicle. The switch is configured to receive the sensor data from the array of sensors and the switch is configured to prioritize a transmission of first sensor data from a first sensor group of the array of sensors over transmission of second sensor data from a second sensor group of the array of sensors. The first sensor data and the second sensor data are prioritized, in time, based on vehicle operation data received by the switch.

In an implementation, the switch includes an input port configured to receive the vehicle operation data from a vehicle bus of the autonomous vehicle. In one implementation the vehicle operation data includes a speed of the autonomous vehicle.

In one illustrative implementation an autonomous vehicle traverses in rearward direction. To travel in rearward direction, the autonomous vehicle may enter a reverse transmission state where the transmission of the vehicle is in reverse. The reverse transmission state may be digitally incorporated into a vehicle operation data packet sent to a time sensitive network switch. When the autonomous vehicle is traversing in the rearward direction, certain sensors in the array of sensors on the autonomous vehicle may be better positioned to detect or image a bicycle or pedestrian behind the vehicle and detecting or imaging the rear of the vehicle may have a higher priority. Hence rear-facing sensors from the array of sensors may be selected based on vehicle operation data that includes a reverse transmission state that indicates a transmission of the vehicle is shifted into reverse. Based on selecting the rear-facing sensors, the switch may prioritize the transmission of the sensor data generated by the rear-facing sensors. Therefore, sensor data from sensors that are better positioned to detect or image particular objects may be prioritized for transmission and/or processing so that the autonomous vehicle has faster access to data corresponding to particular objects that have greater impact on immediate navigation of the autonomous vehicle.

BRIEF DESCRIPTION OF THE DRAWINGS

Non-limiting and non-exhaustive implementations of the invention are described with reference to the following figures, wherein like reference numerals refer to like parts throughout the various views unless otherwise specified.

DETAILED DESCRIPTION

Figure 1A:
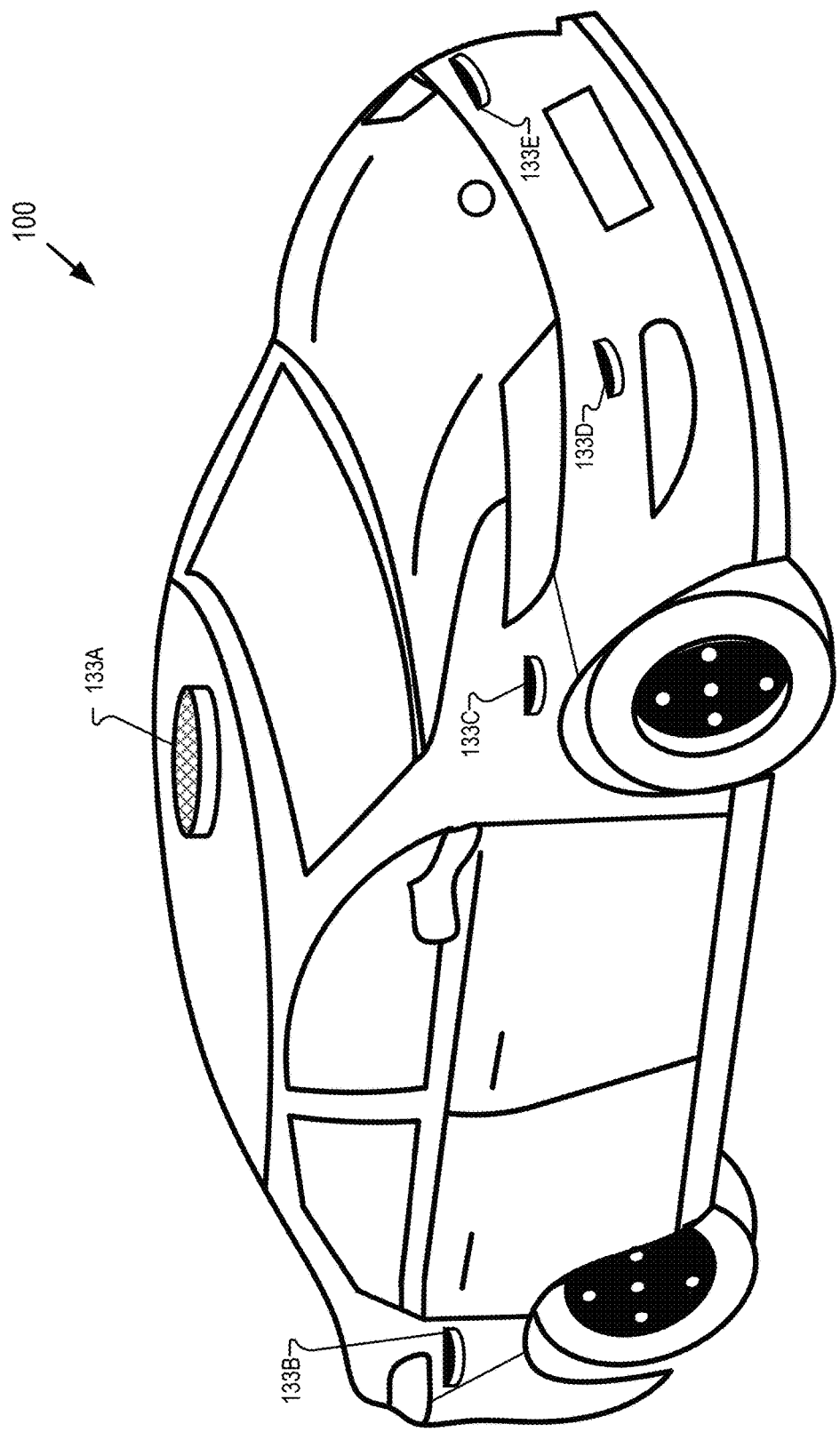
FIG. 1A illustrates an autonomous vehicle including an array of example sensors, in accordance with aspects of the disclosure.

Implementations of an autonomous vehicle and a system for an autonomous vehicle are described herein. In the following description, numerous specific details are set forth to provide a thorough understanding of the implementations. One skilled in the relevant art will recognize, however, that the techniques described herein can be practiced without one or more of the specific details, or with other methods, components, or materials. In other instances, well-known structures, materials, or operations are not shown or described in detail to avoid obscuring certain aspects.

Reference throughout this specification to "one implementation" or "an implementation" means that a particular feature, structure, or characteristic described in connection with the implementation is included in at least one implementation of the present invention. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

Throughout this specification, several terms of art are used. These terms are to take on their ordinary meaning in the art from which they come, unless specifically defined herein or the context of their use would clearly suggest otherwise. For the purposes of this disclosure, the term "autonomous vehicle" includes vehicles with autonomous features at any level of autonomy of the SAE International standard J3016.

This disclosure includes implementations of an autonomous vehicle including a plurality of sensors and prioritizing sensor data based on vehicle operations data of the autonomous vehicle. Example sensors that may be used in autonomous vehicles includes camera systems, Radio Detection and Ranging (RADAR) systems, (Light Detection and Ranging) LIDAR systems, 3D positioning sensors including Global Positioning System (GPS), ultrasonic sensors, and Inertial Measurement Units (IMU). The sensors may be positioned in different locations of the autonomous vehicle and different sensor modalities may be better configured to sense or detect or image objects depending on the speed, direction, and/or transmission-gear of the autonomous vehicle, for example.

In implementations of the disclosure, sensor data from an array of sensors in an autonomous vehicle is received. A switch such as a time sensitive network switch may be configured to receive the sensor data from the array of sensors. Based on vehicle operation data, first sensor data from a first sensor group is prioritized over second sensor data from a second sensor group and the first data is transmitted by the time sensitive network switch for processing prior to the second data being transmitted for processing.

The vehicle operation data may include a transmission-gear of the autonomous vehicle such as Reverse or Drive and the vehicle operation data may be received from a data bus (e.g. Controller Area Network bus) of the autonomous vehicle. If the transmission-gear of the autonomous vehicle is Reverse, sensors imaging the rear of the vehicle may be selected as the first sensor group and the first sensor data from the rear-facing sensors may be prioritized over second sensor data from other sensors. The first sensor data may be transmitted by the switch to processors that generate an external environment representation of the autonomous vehicle and prioritizing certain sensor data may increase the speed that the autonomous vehicle can determine the more relevant objects for navigation in its external environment. The external environment representation may include mapping data and sensor data.

Vehicle operation data may also indicate a direction of the vehicle from an accelerometer or a plurality of readings from a GPS sensor included in the autonomous vehicle. Based on the direction of the autonomous vehicle, sensor data from certain sensors in the array of sensors may be prioritized for transmission.

In a different example, the vehicle operation data may also indicate a speed of the autonomous vehicle from a speedometer or a plurality of readings from a GPS sensor included in the autonomous vehicle. Based on the speed of the autonomous vehicle, sensor data from certain sensors in the array of sensors may be prioritized for transmission to processors that generate an external environment representation of the autonomous vehicle. These and other implementations will be discussed with respect to FIGS. 1A-6 in greater detail below.

Figure 1B:
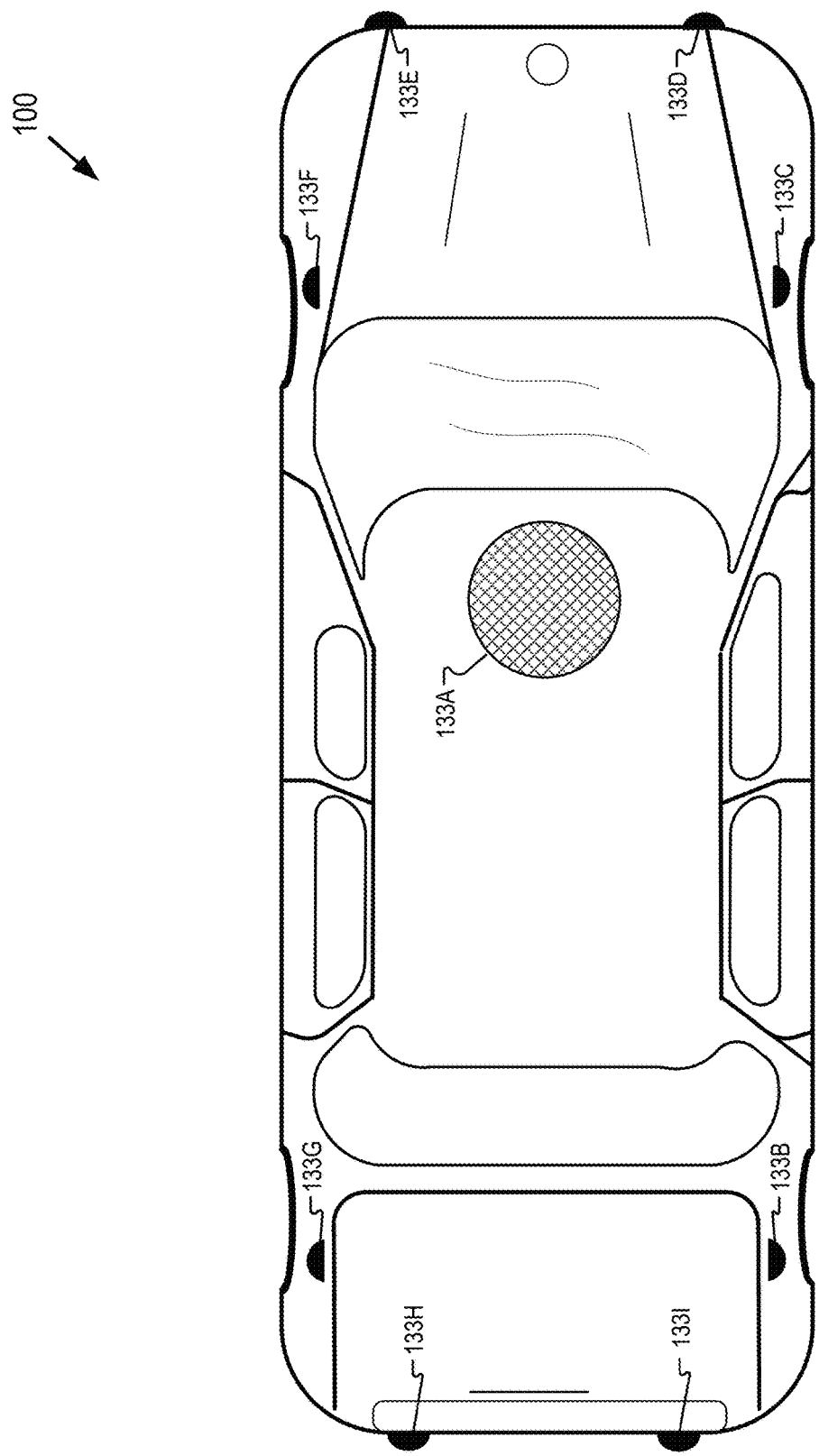
FIG. 1B illustrates a top view of an autonomous vehicle including an array of example sensors, in accordance with aspects of the disclosure.
Figure 1C:
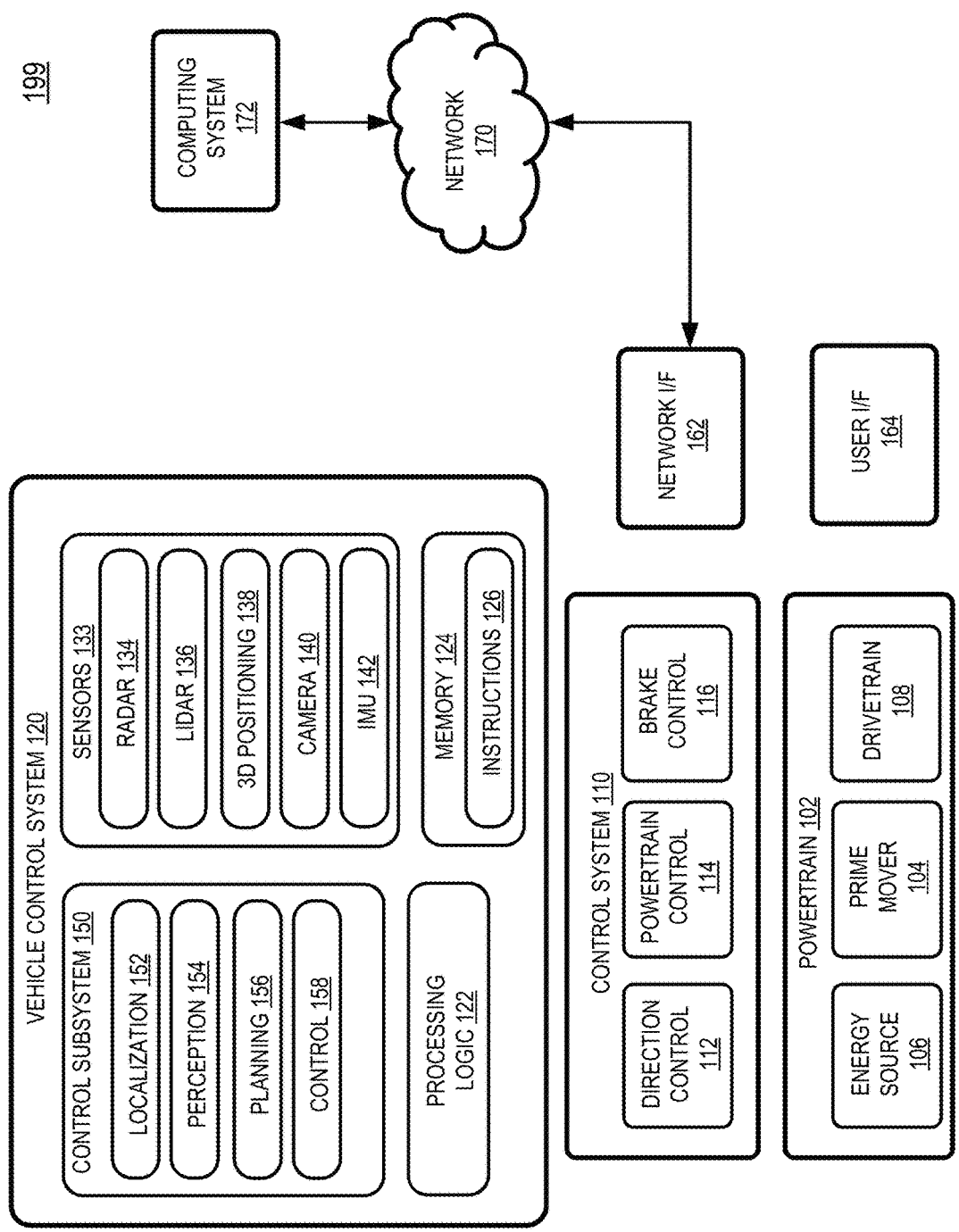
FIG. 1C illustrates an example vehicle control system including sensors, a drivetrain, and a control system, in accordance with aspects of the disclosure.

FIG. 1A illustrates an example autonomous vehicle 100 that includes an array of sensors, in accordance with aspects of the disclosure. The illustrated autonomous vehicle 100 includes an array of sensors configured to capture one or more objects of an external environment of the autonomous vehicle and to generate sensor data related to the captured one or more objects for purposes of controlling the operation of autonomous vehicle 100. FIG. 1A shows sensor 133A, 133B, 133C, 133D, and 133E. FIG. 1B illustrates a top view of autonomous vehicle 100 including sensors 133F, 133G, 133H, and 133I in addition to sensors 133A, 133B, 133C, 133D, and 133E. FIG. 1C illustrates a block diagram 199 of an example system for autonomous vehicle 100. For example, autonomous vehicle 100 may include powertrain 102 including prime mover 104 powered by energy source 106 and capable of providing power to drivetrain 108. Autonomous vehicle 100 may further include control system 110 that includes direction control 112, powertrain control 114, and brake control 116. Autonomous vehicle 100 may be implemented as any number of different vehicles, including vehicles capable of transporting people and/or cargo and capable of traveling in a variety of different environments. It will be appreciated that the aforementioned components 102-116 can vary widely based upon the type of vehicle within which these components are utilized.

The implementations discussed hereinafter, for example, will focus on a wheeled land vehicle such as a car, van, truck, or bus. In such implementations, prime mover 104 may include one or more electric motors and/or an internal combustion engine (among others). The energy source may include, for example, a fuel system (e.g., providing gasoline, diesel, hydrogen), a battery system, solar panels or other renewable energy source, and/or a fuel cell system. Drivetrain 108 may include wheels and/or tires along with a transmission and/or any other mechanical drive components suitable for converting the output of prime mover 104 into vehicular motion, as well as one or more brakes configured to controllably stop or slow the autonomous vehicle 100 and direction or steering components suitable for controlling the trajectory of the autonomous vehicle 100 (e.g., a rack and pinion steering linkage enabling one or more wheels of autonomous vehicle 100 to pivot about a generally vertical axis to vary an angle of the rotational planes of the wheels relative to the longitudinal axis of the vehicle). In some implementations, combinations of powertrains and energy sources may be used (e.g., in the case of electric/gas hybrid vehicles). In some implementations, multiple electric motors (e.g., dedicated to individual wheels or axles) may be used as a prime mover.

Direction control 112 may include one or more actuators and/or sensors for controlling and receiving feedback from the direction or steering components to enable the autonomous vehicle 100 to follow a desired trajectory. Powertrain control 114 may be configured to control the output of powertrain 102, e.g., to control the output power of prime mover 104, to control a gear of a transmission in drivetrain 108, thereby controlling a speed and/or direction of the autonomous vehicle 100. Brake control 116 may be configured to control one or more brakes that slow or stop autonomous vehicle 100, e.g., disk or drum brakes coupled to the wheels of the vehicle.

Other vehicle types, including but not limited to off-road vehicles, all-terrain or tracked vehicles, or construction equipment will necessarily utilize different powertrains, drivetrains, energy sources, direction controls, powertrain controls and brake controls, as will be appreciated by those of ordinary skill having the benefit of the instant disclosure. Moreover, in some implementations some of the components can be combined, e.g., where directional control of a vehicle is primarily handled by varying an output of one or more prime movers. Therefore, implementations disclosed herein are not limited to the particular application of the herein-described techniques in an autonomous wheeled land vehicle.

In the illustrated implementation, autonomous control over autonomous vehicle 100 is implemented in vehicle control system 120, which may include one or more processors in processing logic 122 and one or more memories 124, with processing logic 122 configured to execute program code (e.g. instructions 126) stored in memory 124. Processing logic 122 may include graphics processing unit(s) (GPUs) and/or central processing unit(s) (CPUs), for example.

Sensors 133A-133I may include various sensors suitable for collecting data from an autonomous vehicle's surrounding environment for use in controlling the operation of the autonomous vehicle. For example, sensors 133A-133I can include RADAR unit 134, LIDAR unit 136, 3D positioning sensor(s) 138, e.g., a satellite navigation system such as GPS, GLONASS, BeiDou, Galileo, or Compass. In some implementations, 3D positioning sensor(s) 138 can determine the location of the vehicle on the Earth using satellite signals. Sensors 133A-133I can optionally include one or more ultrasonic sensors, one or more cameras 140, and/or an Inertial Measurement Unit (IMU) 142. In some implementations, camera 140 can be a monographic or stereographic camera and can record still and/or video images. Camera 140 may include a Complementary Metal-Oxide-Semiconductor (CMOS) image sensor configured to capture images of one or more objects in an external environment of autonomous vehicle 100. IMU 142 can include multiple gyroscopes and accelerometers capable of detecting linear and rotational motion of autonomous vehicle 100 in three directions. One or more encoders (not illustrated) such as wheel encoders may be used to monitor the rotation of one or more wheels of autonomous vehicle 100.

The outputs of sensors 133A-133I may be provided to control subsystems 150, including, localization subsystem 152, planning subsystem 156, perception subsystem 154, and control subsystem 158. Localization subsystem 152 is configured to determine the location and orientation (also sometimes referred to as the "pose") of autonomous vehicle 100 within its surrounding environment, and generally within a particular geographic area. The location of an autonomous vehicle can be compared with the location of an additional vehicle in the same environment as part of generating labeled autonomous vehicle data. Perception subsystem 154 is configured to detect, track, classify, and/or determine objects within the environment surrounding autonomous vehicle 100. Planning subsystem 156 is configured to generate a trajectory for autonomous vehicle 100 over a particular timeframe given a desired destination as well as the static and moving objects within the environment. A machine learning model in accordance with several implementations can be utilized in generating a vehicle trajectory. Control subsystem 158 is configured to operate control system 110 in order to implement the trajectory of the autonomous vehicle 100. In some implementations, a machine learning model can be utilized to control an autonomous vehicle to implement the planned trajectory.

It will be appreciated that the collection of components illustrated in FIG. 1C for vehicle control system 120 is merely exemplary in nature. Individual sensors may be omitted in some implementations. In some implementations, different types of sensors illustrated in FIG. 1C may be used for redundancy and/or for covering different regions in an environment surrounding an autonomous vehicle. In some implementations, different types and/or combinations of control subsystems may be used. Further, while subsystems 152-158 are illustrated as being separate from processing logic 122 and memory 124, it will be appreciated that in some implementations, some or all of the functionality of subsystems 152-158 may be implemented with program code such as instructions 126 resident in memory 124 and executed by processing logic 122, and that these subsystems 152-158 may in some instances be implemented using the same processor(s) and/or memory. Subsystems in some implementations may be implemented at least in part using various dedicated circuit logic, various processors, various field programmable gate arrays ("FPGA"), various application-specific integrated circuits ("ASIC"), various real time controllers, and the like, as noted above, multiple subsystems may utilize circuitry, processors, sensors, and/or other components. Further, the various components in vehicle control system 120 may be networked in various manners.

In some implementations, autonomous vehicle 100 may also include a secondary vehicle control system (not illustrated), which may be used as a redundant or backup control system for autonomous vehicle 100. In some implementations, the secondary vehicle control system may be capable of operating autonomous vehicle 100 in response to a particular event. The secondary vehicle control system may only have limited functionality in response to the particular event detected in primary vehicle control system 120. In still other implementations, the secondary vehicle control system may be omitted.

In some implementations, different architectures, including various combinations of software, hardware, circuit logic, sensors, and networks may be used to implement the various components illustrated in FIG. 1C. Each processor may be implemented, for example, as a microprocessor and each memory may represent the random access memory ("RAM") devices comprising a main storage, as well as any supplemental levels of memory, e.g., cache memories, non-volatile or backup memories (e.g., programmable or flash memories), or read-only memories. In addition, each memory may be considered to include memory storage physically located elsewhere in autonomous vehicle 100, e.g., any cache memory in a processor, as well as any storage capacity used as a virtual memory, e.g., as stored on a mass storage device or another computer controller. Processing logic 122 illustrated in FIG. 1C, or entirely separate processing logic, may be used to implement additional functionality in autonomous vehicle 100 outside of the purposes of autonomous control, e.g., to control entertainment systems, to operate doors, lights, or convenience features.

In addition, for additional storage, autonomous vehicle 100 may also include one or more mass storage devices, e.g., a removable disk drive, a hard disk drive, a direct access storage device ("DASD"), an optical drive (e.g., a CD drive, a DVD drive), a solid state storage drive ("SSD"), network attached storage, a storage area network, and/or a tape drive, among others. Furthermore, autonomous vehicle 100 may include a user interface 164 to enable autonomous vehicle 100 to receive a number of inputs from a passenger and generate outputs for the passenger, e.g., one or more displays, touchscreens, voice and/or gesture interfaces, buttons and other tactile controls. In some implementations, input from the passenger may be received through another computer or electronic device, e.g., through an app on a mobile device or through a web interface.

In some implementations, autonomous vehicle 100 may include one or more network interfaces, e.g., network interface 162, suitable for communicating with one or more networks 170 (e.g., a Local Area Network ("LAN"), a wide area network ("WAN"), a wireless network, and/or the Internet, among others) to permit the communication of information with other computers and electronic devices, including, for example, a central service, such as a cloud service, from which autonomous vehicle 100 receives environmental and other data for use in autonomous control thereof. In some implementations, data collected by one or more sensors 133A-133I can be uploaded to computing system 172 through network 170 for additional processing. In such implementations, a time stamp can be associated with each instance of vehicle data prior to uploading.

Processing logic 122 illustrated in FIG. 1C, as well as various additional controllers and subsystems disclosed herein, generally operates under the control of an operating system and executes or otherwise relies upon various computer software applications, components, programs, objects, modules, or data structures, as may be described in greater detail below. Moreover, various applications, components, programs, objects, or modules may also execute on one or more processors in another computer coupled to autonomous vehicle 100 through network 170, e.g., in a distributed, cloud-based, or client-server computing environment, whereby the processing required to implement the functions of a computer program may be allocated to multiple computers and/or services over a network.

Routines executed to implement the various implementations described herein, whether implemented as part of an operating system or a specific application, component, program, object, module or sequence of instructions, or even a subset thereof, will be referred to herein as "program code." Program code typically comprises one or more instructions that are resident at various times in various memory and storage devices, and that, when read and executed by one or more processors, perform the steps necessary to execute steps or elements embodying the various aspects of the invention. Moreover, while implementations have and hereinafter may be described in the context of fully functioning computers and systems, it will be appreciated that the various implementations described herein are capable of being distributed as a program product in a variety of forms, and that implementations can be implemented regardless of the particular type of computer readable media used to actually carry out the distribution. Examples of computer readable media include tangible, non-transitory media such as volatile and non-volatile memory devices, floppy and other removable disks, solid state drives, hard disk drives, magnetic tape, and optical disks (e.g., CD-ROMs, DVDs) among others.

In addition, various program code described hereinafter may be identified based upon the application within which it is implemented in a specific implementation. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets), it should be appreciated that the invention is not limited to the specific organization and allocation of program functionality described herein.

Those skilled in the art, having the benefit of the present disclosure, will recognize that the exemplary environment illustrated in FIG. 1C is not intended to limit implementations disclosed herein. Indeed, those skilled in the art will recognize that other alternative hardware and/or software environments may be used without departing from the scope of implementations disclosed herein.

Figure 2:
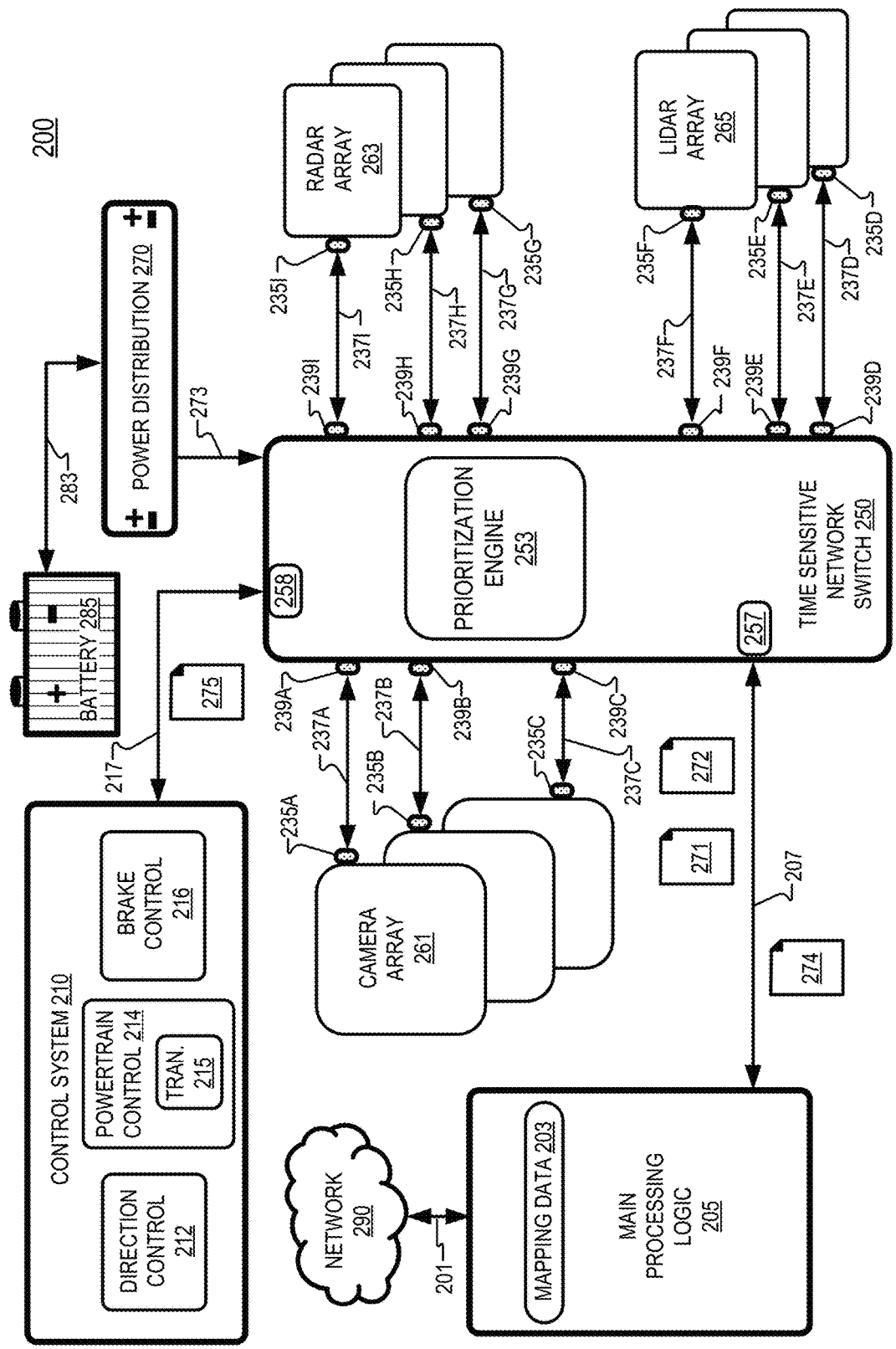
FIG. 2 illustrates a block diagram of an example system that may be included in a vehicle, in accordance with aspects of the disclosure.

FIG. 2 illustrates a block diagram of example system 200 that may be included in an autonomous vehicle, in accordance with aspects of the disclosure. System 200 includes main processing logic 205, time sensitive network switch 250, power distribution module 270, vehicle battery 285, network 290, camera array 261, RADAR sensor array 263, and LIDAR sensor array 265. Sensors in addition to camera array 261, RADAR sensor array 263, and LIDAR sensor array 265 may also be included in system 200. Vehicle battery 285 may be a main vehicle battery for a vehicle such as autonomous vehicle 100 for operating the vehicle electrical subsystems. Vehicle battery 285 may provide a voltage of 12-14 VDC, for example. Vehicle battery 285 is configured to provide electrical power to power distribution module 270 through battery interface 283, in FIG. 2. Power distribution module 270 may be configured to convert the vehicle battery voltage provided by vehicle battery 285 to an elevated voltage and provide the elevated voltage to time sensitive network switch 250 through elevated voltage interface 273. Power distribution module 270 may include power converters and/or power regulators (e.g. switching power supplies) configured to convert the vehicle battery voltage to an elevated voltage.

In addition to receiving the elevated voltage from power distribution module 270, time sensitive network switch 250 is configured to send and receive data. In autonomous vehicles, high-speed data transfer for data that impacts vehicle operation is critical. Time sensitive network switch 250 is communicatively coupled to main processing logic 205 through high-speed data interface 207. High-speed data interface 207 may be one or more 10 Gigabit per second (Gb/s) connections. In an implementation, main processing logic 205 is communicatively coupled to time sensitive network switch 250 through two 10 Gb/s connections of high-speed data interface 207.

Main processing logic 205 may be a processing board including a plurality of multi-core processors and a plurality of memory devices. The processing board may also include communication interfaces and be coupled to a heat-sink or be cooled by a fan system. Main processing logic 205 may process the sensor data received from time sensitive network switch 250 to determine objects in an external environment of an autonomous vehicle and operate the vehicle based at least in part on the determination. "Objects" may include inanimate objects such as obstacles, barriers, building, other vehicles, poles, and/or signs, for example. Objects may, in some implementations, refer additionally to actors on the road such as pedestrians and bicyclists. In some implementations, main processing logic 205 accesses mapping data 203 in addition to processing the sensor data received from time sensitive network switch 250 to determine operation instructions for operating the autonomous vehicle. Mapping data 203 may have been collected by vehicles other than the vehicle that is collecting the sensor data. Mapping data 203 may include positions of static bodies (e.g. buildings, barriers, streets) in an external environment of an autonomous vehicle. Mapping data 203 may be provided to main processing logic 205 from network 290 through interface 201. In some implementations, interface 201 is a wireless protocol such as IEEE 802.11 protocols or cellular data protocols (e.g. 3G, 4G, LTE, 5G). Mapping data 203 may be updated by a plurality of vehicles and periodically or continually updated by main processing logic 205 by downloading the updated mapping data from network 290.

In the illustrated implementation, main processing logic 205 may determine an operation instruction based at least in part on the received sensor data. Main processing logic 205 may then send that operation instruction to control system 210 by way of high-speed data interface 207, time sensitive network switch 250, and control interface 217. Control interface 217 is communicatively coupled between interface 258 of time sensitive network switch 250 and control system 210. Interface 258 may include an input port and an output port. Control interface 217 may be one or more 10 Gb/s connections. Control system 210 includes direction control 212, powertrain control 214, and brake control 216, which may be configured similarly to direction control 112, powertrain control 114, and brake control 116 illustrated in FIG. 1C, respectively. Therefore, operation instructions generated by main processing logic 205 may be generated based on mapping data 203 and the sensor data received from time sensitive network switch 250. Once main processing logic 205 generates the operation instruction(s), the operations instruction(s) may be sent to control system 210 through time sensitive network switch 250.

Time sensitive network switch 250 is individually coupled to a plurality of sensors by way of a data-power interface, in FIG. 2. In the particular illustration of FIG. 2, time sensitive network switch 250 is individually coupled to each camera in camera array 261 through data-power interfaces 237A, 237B, and 237C. That is, each camera in camera array 261 has a connector (e.g. connectors 235A-235C) coupled to a connector (e.g. connectors 239A-239C) of time sensitive network switch 250 through its own data-power interface (e.g. data-power interface 237A-237C). In the illustrated implementation of FIG. 2, connector 235A is coupled to connector 239A through data-power interface 237A, connector 237B is coupled to connector 239B through data-power interface 237B, and connector 237C is coupled to connector 239C through data-power interface 237C. Similarly, time sensitive network switch 250 is individually coupled to each RADAR sensor in RADAR sensor array 263 through data-power interfaces 237G, 237H, and 237I. That is, each RADAR sensor in RADAR sensor array 263 has a connector (e.g. connectors 235G-235I) coupled to a connector (e.g. connectors 239G-239I) of time sensitive network switch 250 through its own data-power interface (e.g. data-power interface 237G-237I). In the illustrated implementation of FIG. 2, connector 235G is coupled to connector 239G through data-power interface 237G, connector 235H is coupled to connector 239H through data-power interface 237H, and connector 235I is coupled to connector 239I through data-power interface 237I. FIG. 2 also illustrates that time sensitive network switch 250 is individually coupled to each LIDAR sensor in LIDAR sensor array 265 through data-power interfaces 237D, 237E, and 237F. That is, each LIDAR sensor in LIDAR sensor array 265 has a connector (e.g. connectors 235D-235F) coupled to a connector (e.g. connectors 239D-239F) of time sensitive network switch 250 through its own data-power interface (e.g. data-power interface 237D-237F). In the illustrated implementation of FIG. 2, connector 235D is coupled to connector 239D through data-power interface 237D, connector 235E is coupled to connector 239E through data-power interface 237E, and connector 235F is coupled to connector 239F through data-power interface 237F. In these implementations, the cameras, RADAR sensors, and LIDAR sensor are merely examples of sensors that can be implemented as sensors of an autonomous vehicle that may be coupled to time sensitive network switch 250 through a data-power interface (e.g., data-power interface 237A-237I). Consequently, the data-power interface may separately couple any sensors that are utilized in different implementations to time sensitive network switch 250 where time sensitive network switch 250 includes a separate connector for the data-power interface of each sensor in the array of sensors.

Data-power interfaces 237A-237I includes at least one high-speed vehicle communication link and may also provide an elevated voltage to each sensor to power the sensor. The high-speed vehicle communication link may be defined as more than 100 Megabits per second (Mb/s), in some implementations.

Time sensitive network switch 250 is configured to receive sensor data from any of the sensors in the array of sensors that are coupled to time sensitive network switch 250 through data-power interface 237. Time sensitive network switch 250 is "time sensitive" because it is configured to transfer the received sensor data to main processing logic 205 with very little delay so that main processing logic 205 can utilize the sensor data to operate the autonomous vehicle to be responsive to objects that are sensed by the sensors. Time sensitive network switch 250 may time-stamp received sensor data before forwarding the sensor data to main processing logic 205. Time sensitive network switch 250 may include a plurality of multi-core processors. Time sensitive network switch 250 includes prioritization engine 253 to prioritize the transmission of selected sensor data through interface 257, in FIG. 2. For example, prioritization engine 253 may prioritize the transmission of first sensor data from particular sensors over the transmission of second sensor data from different sensor based on vehicle operation data of the autonomous vehicle. In some implementations, one or more processors that is external to a time sensitive swtich may control the time sensitive network switch to prioritize particular sensor data.

In some implementations, a time sensitive network switch can prioritize the transmission of sensor data in multiple levels. For example, a time sensitive network switch can prioritize the transmission of sensor data from a first sensor group, then allow the transmission of sensor data from a second sensor group, and then allow the transmission of sensor data from a third sensor group.

In some implementations, a time sensitive network switch can prioritize the transmission of sensor data within a group of sensors. For example, where an array of sensors includes multiple LIDAR sensors, a time sensitive network switch can prioritize the transmission of sensor data from a particular LIDAR sensor over transmission of sensor data from LIDAR sensors other than the particular LIDAR sensor. In some implementations, a time sensitive network switch can prioritize the transmission of sensor data in multiple levels. For example, where an array of sensors includes multiple LIDAR sensors, a time sensitive network switch can prioritize the transmission of sensor data from a first LIDAR sensor, then allow the transmission of sensor data from a second LIDAR sensor, and then allow the transmission of sensor data from a third LIDAR sensor.

Interface 257 may include an input communication port and an output communication port. The output communication port is configured to transmit sensor data such as first sensor data 271 and second sensor data 272 to main processing logic 205 and the input communication port is configured to receive data such as operation instructions 274 from main processing logic 205.

Figure 3:
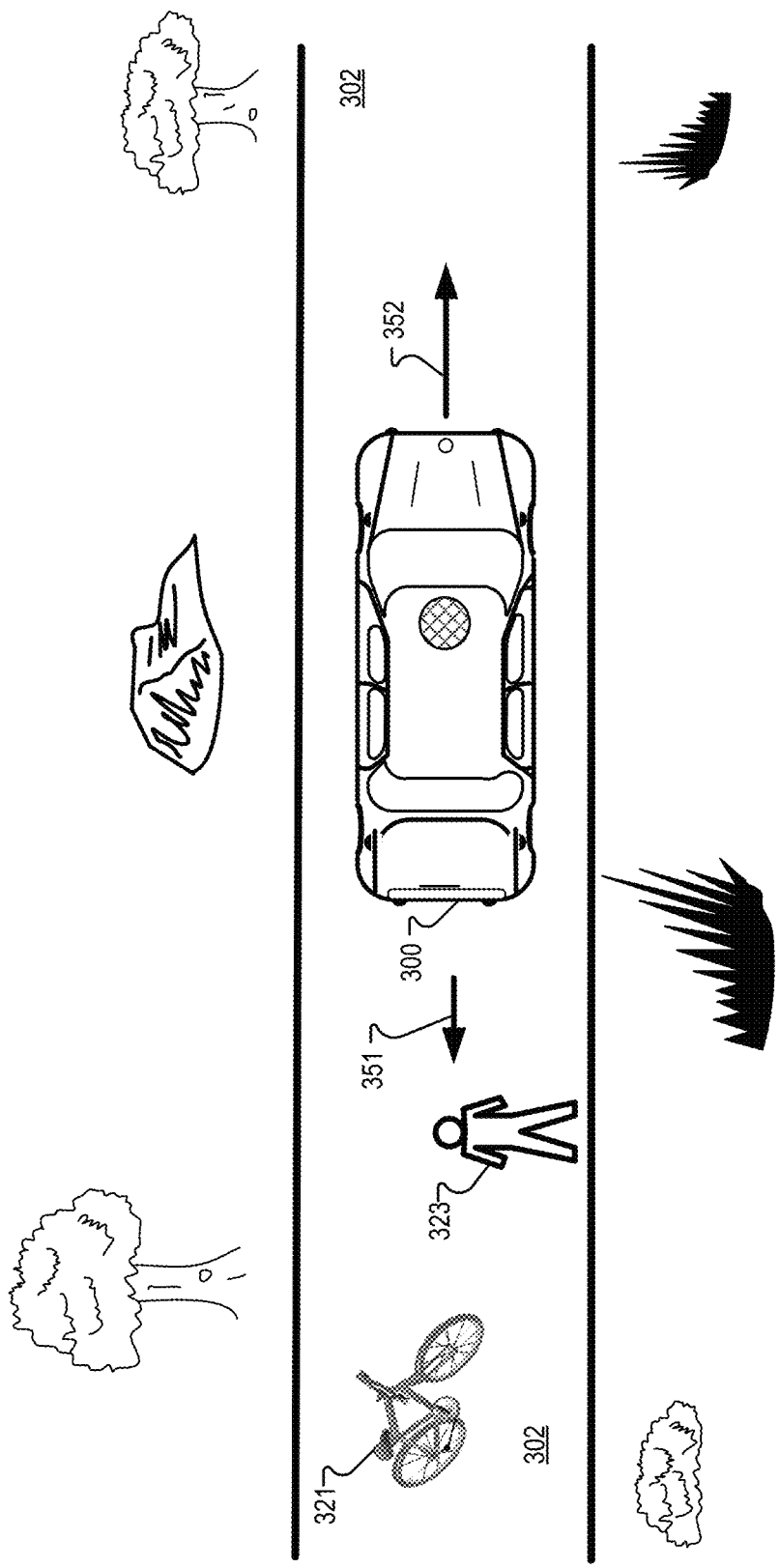
FIG. 3 illustrates an autonomous vehicle navigating a roadway, in accordance with aspects of the disclosure.

FIG. 3 illustrates autonomous vehicle 300 navigating roadway 302, in accordance with aspects of the disclosure. In one illustrative example, roadway 302 is a driveway or alley and autonomous vehicle 300 traverses in rearward direction 351. To travel in rearward direction 351, autonomous vehicle 300 may enter a reverse transmission state where the transmission of the vehicle is in reverse. In the implementation of FIG. 2, transmission 215 of powertrain control 214 may be shifted into reverse and vehicle operation data 275 including the reverse transmission state may be sent to prioritization engine 253 of time sensitive network switch 250 through control interface 217. The reverse transmission state may be digitally incorporated into a vehicle operation data packet sent over a Controller Area Network (CAN) bus of autonomous vehicle 300 that is also transmitted over control interface 217 to time sensitive network switch 250. Vehicle operation data 275 is indicative of an operation state of an autonomous vehicle and is derived from sensors included in autonomous vehicle 300 or data accessible from within autonomous vehicle 300. Vehicle operation data 275 may include a transmission state of the vehicle (e.g. reverse or drive), a speed of the vehicle measured by the speedometer or derived from a GPS sensor of the vehicle, a direction of the vehicle derived from accelerometer of GPS data, or otherwise.

When autonomous vehicle 300 is traversing in rearward direction 351, certain sensors in the array of sensors of autonomous vehicle 300 may be better positioned to detect or image bicycle 321 or pedestrian 323 and imaging the rear of the vehicle may have a higher priority. Hence, in an implementation, a first sensor group (e.g. rear sensors) may be selected from an array of sensors based on vehicle operation data that includes a reverse transmission state that indicates a transmission of the vehicle is shifted into reverse. Based on selecting the first sensor group (e.g. rear-facing sensors), time sensitive network switch 250 may prioritize the transmission of the first sensor data from the first sensor group over transmission of second sensor data from a second sensor group in the array of sensors. The second sensor group may be the remainder of the non-selected sensors in the array of sensors, in some implementations. For example, if the rear sensor(s) are the selected first sensor group, the second sensor group may include front sensors configured to detect or image the front of the vehicle and/or side sensors configured to detect or image the sides of the vehicle.

Figure 5:
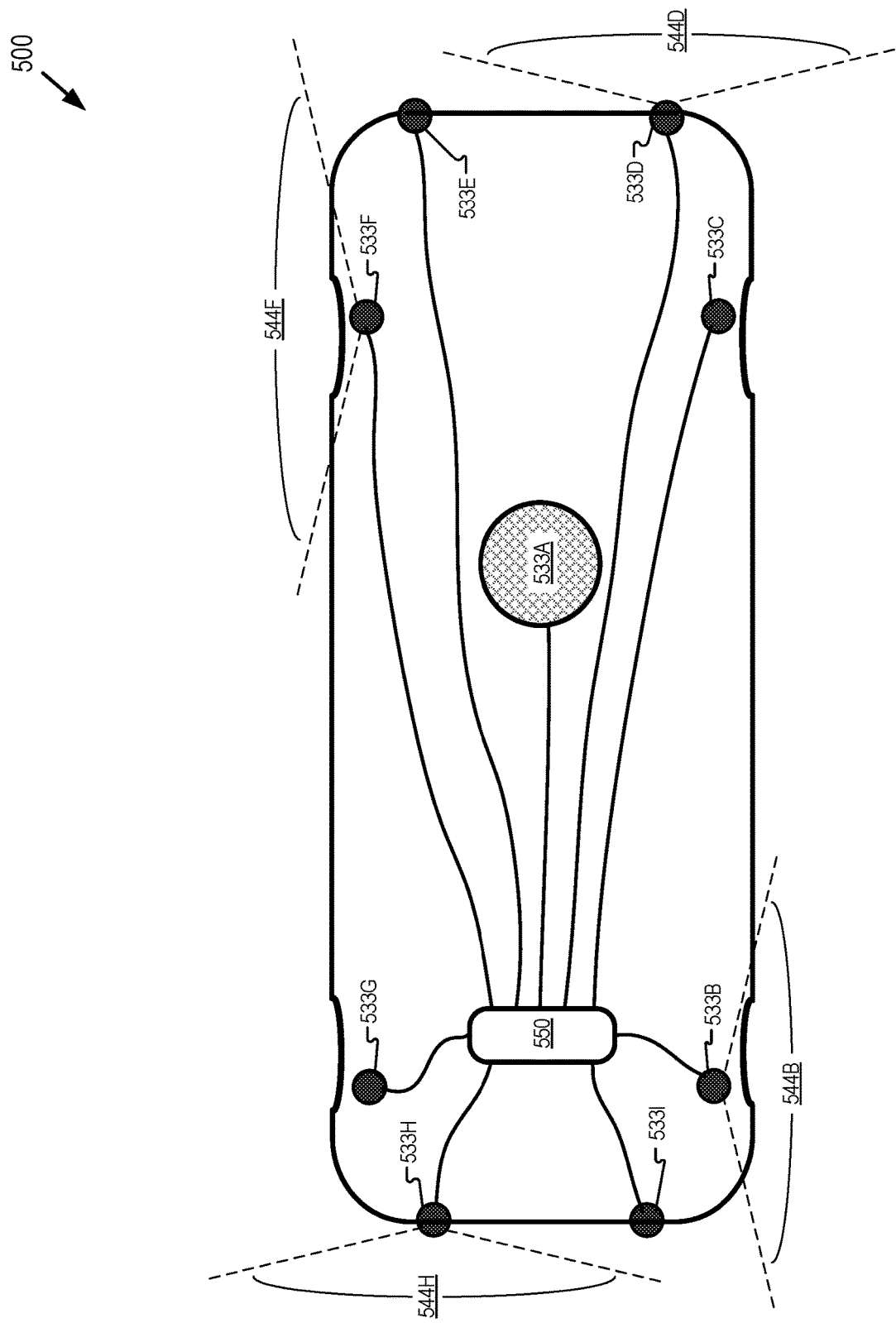
FIG. 5 illustrates various sensors and a field-of-imaging of sensors of an autonomous vehicle, in accordance with aspects of the disclosure.

Referring to FIG. 5, sensors 533H and 533I may be considered "rear sensors." Sensors 533B and 533G may also be considered "rear sensors," in some implementations. Sensors 533C, 533D, 533E, and 533F may be considered "front sensors," in some implementations. In one implementation, only sensors 533E and 533D are considered "front sensors." FIG. 5 illustrates sensors 533A-533I that provide sensor data to time sensitive network switch 550 may have different fields-of-imaging 544A-544I depending on a position of the sensor in autonomous vehicle 500. Sensors 533A-533I are coupled to provide sensor data to time sensitive network switch 550. Time sensitive network switch 550 may be configured similarly to time sensitive network switch 250. FIG. 5 illustrates a total of nine sensors 533A-533I included in autonomous vehicle 500, although more sensors or fewer sensors may be used in other systems. Sensor 533B may be best positioned to detect or image objects proximate to the right-rear side of autonomous vehicle 500 that are in field-of-imaging 544B of sensor 533B. Field-of-imaging 544B of sensor 533B may be 180 degrees or more. Similarly, sensor 533D may be best positioned to detect or image objects proximate to the right-front side of autonomous vehicle 500 that are in field-of-imaging 544D of sensor 533D. Sensor 533F may be best positioned to detect or image objects proximate to the left-front side of autonomous vehicle 500 that are in field-of-imaging 544F of sensor 533F. Sensor 533H may be best positioned to detect or image objects proximate to the left-rear side of autonomous vehicle 500 that are in field-of-imaging 544H of sensor 533H. Of course, sensors 533C, 533D, 533G, and 533I are also configured to detect or image objects in their field-of-imaging (not illustrated) and sensor 533A may have a 360 degree field-of-imaging when it is disposed on the top of autonomous vehicle 500. Accordingly, sensor 533A may be selected as a rear sensor or a front sensor when a field-of-imaging for sensor 533A includes the rear-ward area of autonomous vehicle 500 or the frontside of autonomous vehicle 500, respectively.

Returning again to FIG. 3, autonomous vehicle 300 may traverse in forward direction 352 on roadway 302. To travel in forward direction 352, autonomous vehicle 300 may enter a forward-gear transmission state where the transmission of the vehicle is in drive. In the implementation of FIG. 2, transmission 215 of powertrain control 214 may be shifted into drive and vehicle operation data 275 including the forward-gear transmission state may be sent to prioritization engine 253 of time sensitive network switch 250 through control interface 217. The forward-gear transmission state may be digitally incorporated into a vehicle operation data packet sent over a CAN bus of autonomous vehicle 300 that is also transmitted over control interface 217 to time sensitive network switch 250.

When autonomous vehicle 300 is traversing in forward direction 352, sensors in the array of sensors of autonomous vehicle 300 may be better positioned to detect or image objects in front of autonomous vehicle 300. Sensor data from those sensors may have a higher imaging priority. Hence, in an implementation, a first sensor group (e.g. front sensors) may be selected from an array of sensors based on vehicle operation data that includes a forward-gear transmission state that indicates a transmission of the vehicle is shifted into drive. Based on selecting the first sensor group (e.g. front sensors), time sensitive network switch 250 may prioritize the transmission of the first sensor data from the first sensor group over transmission of second sensor data from a second sensor group in the array of sensors. The second sensor group may be the remainder of the non-selected sensors in the array of sensors, in some implementations. For example, if the front sensor(s) are the selected first sensor group, the second sensor group may include rear sensors configured to detect or image the rear-ward area of the vehicle and/or side sensors configured to detect or image the sides of the vehicle.

In some implementations, one or more measurements from an accelerometer included in autonomous vehicle 300 is used to determine that autonomous vehicle 300 is traversing in rearward direction 351 or forward direction 352. In another implementation, a plurality of readings from a GPS sensor included in autonomous vehicle 300 is used to determine that autonomous vehicle 300 is traversing in rearward direction 351 or forward direction 352. Vehicle operation data 275 may include forward direction 352 or rearward direction 351 of autonomous vehicle 300 derived from accelerometer or GPS sensor measurements and based on the direction of the autonomous vehicle, sensor data from certain sensors in the array of sensors may be prioritized for transmission.

Figure 4:
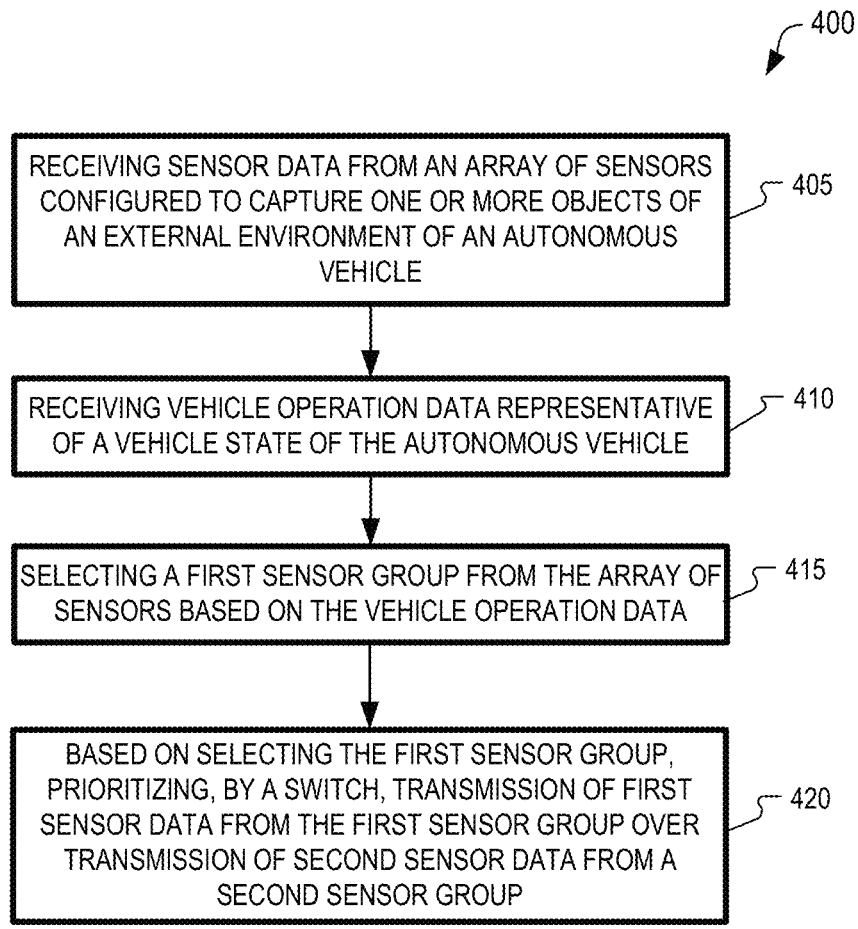
FIG. 4 illustrates a flow chart with an example process of prioritizing sensor data based on vehicle operation data, in accordance with aspects of the disclosure.

FIG. 4 illustrates a flow chart with an example process 400 of prioritizing sensor data based on vehicle operation data, in accordance with aspects of the disclosure. The order in which some or all of the process blocks appear in process 400 should not be deemed limiting. Rather, one of ordinary skill in the art having the benefit of the present disclosure will understand that some of the process blocks may be executed in a variety of orders not illustrated, or even in parallel. All or a portion of the process blocks illustrated in FIG. 4 may be performed by time sensitive network switch 250, for example.

In process block 405, sensor data from an array of sensors is received. The sensors in the array of sensors are configured to capture one or more objects of an external environment of an autonomous vehicle by generating the sensor data (e.g. an image) of the captured one or more objects. Any of sensors 133A-133I in FIG. 1B or sensors 533A-533I in FIG. 5 may be in the array of sensors, for example.

In process block 410, vehicle operation data representative of a vehicle state of the autonomous vehicle is received. The vehicle state indicates a transmission gear (e.g. drive or reverse) of a transmission of the autonomous vehicle, in some implementations. The vehicle operation data indicates a speed of the autonomous vehicle, in some implementations. In some implementations, the vehicle operation data indicates a direction of travel of the autonomous vehicle. The vehicle operation data may be received from a vehicle data bus (e.g. CAN bus) of the autonomous vehicle.

In process block 415, a first sensor group is selected from the array of sensors of the autonomous vehicle based on the vehicle operation data. The first sensor group may be a single sensor. When the vehicle operation data indicates a rearward direction, rear-facing sensors may be selected in the first sensor group. When vehicle operation data indicates a forward direction, front-facing sensors may be selected in the first sensor group.

In process block 420, transmission of first data generated by the first sensor group is prioritized by a switch based on selecting the first sensor group. Transmission of the first data is prioritized, by the switch, over transmission of second sensor data generated by a second sensor group in the array of sensors. In FIG. 2, first sensor data 271 may be sent to main processing logic 205 prior to second sensor data 272, even when the first sensor data and the second sensor data are received by time sensitive network switch 250 at approximately the same time, for example. Main processing logic 205 may generate an external environment representation of the autonomous vehicle with the first sensor data. The external environment representation may include mapping data and sensor data. In some implementations, a switch that does not have all the characteristics of time sensitive network switch 250 may be utilized in place of a time sensitive network switch. For example, a switch may be utilized that does not time-stamp received sensor data. Utilizing a time sensitive network switch may assist in transferring sensor data with very little delay so that the sensor data can be utilized to operate the autonomous vehicle to be responsive to objects that are detected by the sensors. A time sensitive network switch may time-stamp received sensor data before transferring the sensor data so that processing logic that assists in operating the autonomous vehicle is able to synthesize sensor data that was detected during a same time period.

Previous sensor data and mapping data may also be utilized in generating the external environment representation. In one implementation of process 400, an updated external environment representation of the autonomous vehicle is generated with the second sensor data and the updated external environment representation of the autonomous vehicle is generated subsequently to the external environment representation. The external environment representation and the updated external environment representation may be utilized by planning subsystem 156 of FIG. 1C for planning a trajectory for an autonomous vehicle while avoiding the static and moving objects within the external environment of the autonomous vehicle, for example. Control subsystem 158 may send operation instruction to control system 110 based on the planned trajectory determined by planning subsystem 156. When planning subsystem 156 is executed at least in part by main processing logic 205 of FIG. 2, operation instructions 274 may be sent to control system 210 through high-speed data interface 207, time sensitive network switch 250, and control interface 217. Control system 210 may then apply the operation instructions to control the autonomous vehicle.

In one implementation of process 400, the transmission of the first sensor data and the second sensor data is from time sensitive network switch 250 to main processing logic 205 of the autonomous vehicle and time sensitive network switch 250 is configured to receive the first sensor data and the second sensor data from the array of sensors.

In one implementation of process 400, the array of sensors includes rear sensors disposed to detect or image a rear-ward area of the autonomous vehicle and front sensors disposed to detect or image a frontside area of the autonomous vehicle and the vehicle operation data indicates a rear-ward direction of the autonomous vehicle. In this implementation, the first sensor data (prioritized in transmission) may be generated by the rear sensors and the second sensor data is generated by the front sensors.

In one implementation of process 400, the array of sensors includes rear sensors disposed to detect or image a rear-ward area of the autonomous vehicle and front sensors disposed to detect or image a frontside area of the autonomous vehicle and the vehicle operation data indicates a forward direction of the autonomous vehicle. In this implementation, the first sensor data (prioritized in transmission) is generated by the front sensors and the second sensor data is generated by the rear sensors.

When first sensor data is being prioritized over second sensor data (by time sensitive network switch 250 for example), an external environment representation of the autonomous vehicle may be generated without necessarily waiting for the benefit of the second sensor data to update the external environment representation. Thus, in accordance with process 400 and aspects of this disclosure, main processing logic 205 may be updated at a faster rate with potentially the most useful of the sensor data to generate and regenerate external environment representations of the autonomous vehicle that include static and moving objects.

Figure 6:
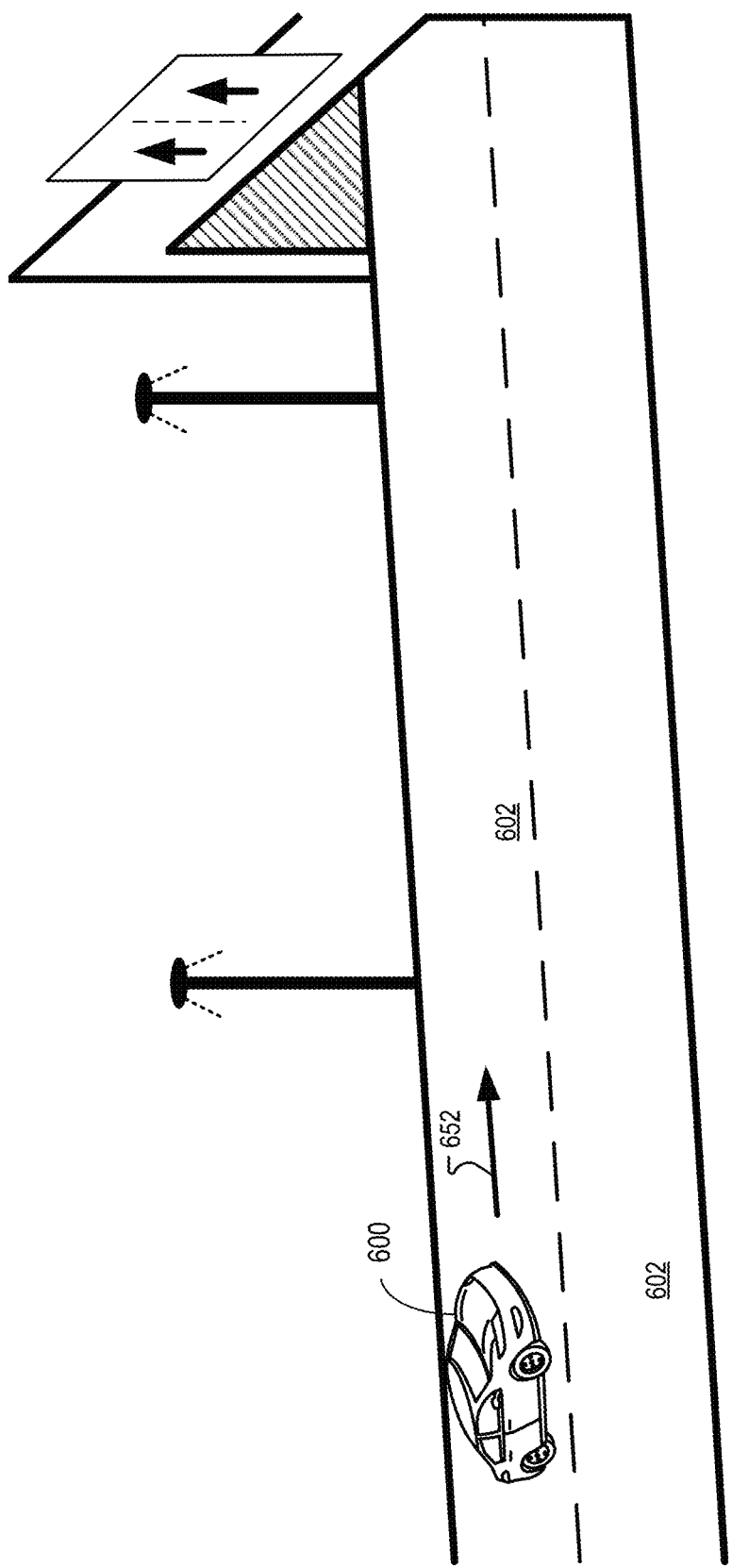
FIG. 6 illustrates an autonomous vehicle travelling in a forward direction on a roadway, in accordance with aspects of the disclosure.

FIG. 6 illustrates autonomous vehicle 600 traveling in a forward direction 652 on roadway 602, in accordance with aspects of the disclosure. In one implementation, sensor data from particular sensors are prioritized based on a speed of autonomous vehicle 600 included in the vehicle operation data. The speed of the vehicle may be received digitally from the speedometer of the vehicle or derived from a series of GPS measurements, for example. When autonomous vehicle 600 is travelling at highway speeds, the front sensors may be selected and first sensor data from the front sensors may be prioritized by time sensitive network switch 250 for transmission to main processing logic 205. In an implementation, the sensors selected as the first sensor group may be based on a modality of the sensors (e.g. image sensor, LIDAR, RADAR, ultrasonic) based on a speed of the vehicle included in the vehicle operation data. Additionally, certain sensors may be configured for near-field or far-field imaging such as image sensors having lenses of different focal lengths. Other sensors of the same type may also be configured for near-field or far-field imaging based on the wavelength or intensity of illumination light or the frequency or beam shape of transmitted radio waves. Therefore, for any of these above reasons, certain sensor data generated by different sensors may be prioritized, in transmission, based on a speed of the vehicle, in accordance with implementations of the disclosure.

The term "processing logic" (e.g. main processing logic 205 or processing logic 122) in this disclosure may include one or more processors, microprocessors, multi-core processors, and/or Field Programmable Gate Arrays (FPGAs) to execute operations disclosed herein. In some implementations, memories (not illustrated) are integrated into the processing logic to store instructions to execute operations and/or store data. Processing logic may include analog or digital circuitry to perform the operations disclosed herein.

Network 170 and/or 290 may include any network or network system such as, but not limited to, the following: a peer-to-peer network; a Local Area Network (LAN); a Wide Area Network (WAN); a public network, such as the Internet; a private network; a cellular network; a wireless network; a wired network; a wireless and wired combination network; and a satellite network.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible non-transitory machine-readable storage medium includes any mechanism that provides (i.e., stores) information in a form accessible by a machine (e.g., a computer, network device, personal digital assistant, manufacturing tool, any device with a set of one or more processors). For example, a machine-readable storage medium includes recordable/non-recordable media (e.g., read only memory (ROM), random access memory (RAM), magnetic disk storage media, optical storage media, flash memory devices).

The above description of illustrated implementations of the invention, including what is described in the Abstract, is not intended to be exhaustive or to limit the invention to the precise forms disclosed. While specific implementations of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific implementations disclosed in the specification. Rather, the scope of the invention is to be determined entirely by the following claims, which are to be construed in accordance with established doctrines of claim interpretation.

What is claimed is:

1. An autonomous vehicle comprising:
   a control system configured to determine a direction and a speed of the autonomous vehicle based on operation instructions;
   an array of sensors configured to capture one or more objects in an external environment of the autonomous vehicle and generate sensor data related to the one or more objects;
   processing logic configured to receive the sensor data and generate the operation instructions based on the sensor data; and
   a switch coupled to the array of sensors, the processing logic, and the control system, wherein the switch is configured to buffer the processing logic from the sensor data, wherein the switch is configured to provide the operation instructions from the processing logic to the control system, wherein the switch is configured to receive the sensor data from the array of sensors, wherein the switch receives first sensor data from a first sensor group of the array of sensors and second sensor data from a second sensor group of the array of sensors, wherein the switch includes:
      a prioritization engine configured to prioritize an order of transmission, from the switch to the processing logic, of the first sensor data over the second sensor data, wherein the order of transmission of the first sensor data and the second sensor data is prioritized based on vehicle operation data received by the prioritization engine; and
      an output communication port configured to transmit the first sensor data to the processing logic prior to sending the second sensor data.

2. The autonomous vehicle of claim 1, wherein the array of sensors includes rear sensors disposed to detect a rearward area of the autonomous vehicle and front sensors disposed to detect a frontside area of the autonomous vehicle, and wherein the vehicle operation data indicates a rear-ward direction of the autonomous vehicle,
   and further wherein the first sensor data is generated by the rear sensors and the second sensor data is generated by the front sensors.

3. The autonomous vehicle of claim 2, wherein the switch includes an input port configured to receive the vehicle operation data from a vehicle bus of the autonomous vehicle, and wherein the vehicle operation data includes a reverse transmission state.

4. The autonomous vehicle of claim 1, wherein the array of sensors includes rear sensors disposed to detect a rearward area of the autonomous vehicle and front sensors disposed to detect a frontside area of the autonomous vehicle, and wherein the vehicle operation data indicates a forward direction of the autonomous vehicle,
   and further wherein the first sensor data is generated by the front sensors and the second sensor data is generated by the rear sensors.

5. The autonomous vehicle of claim 4, wherein the switch includes an input port configured to receive the vehicle operation data from a vehicle bus of the autonomous vehicle, and wherein the vehicle operation data includes a forward-gear transmission state.

6. The autonomous vehicle of claim 1, wherein the vehicle operation data includes the speed of the autonomous vehicle.

7. The autonomous vehicle of claim 1, wherein the array of sensors includes at least one of a LIDAR sensor, an ultrasonic sensor, a camera, or a RADAR sensor.

8. A method of prioritizing data transfer in an autonomous vehicle, the method comprising:
   determining, with a control system, a direction and a speed of the autonomous vehicle based on operation instructions;
   receiving sensor data from an array of sensors configured to capture one or more objects of an external environment of the autonomous vehicle, wherein receiving sensor data includes receiving, with a switch, first sensor data from a first sensor group and second sensor data from a second sensor group of the array of sensors;
   generating, with processing logic, the operation instructions based on the sensor data;
   providing, with the switch, the operation instructions to the control system from the processing logic;
   receiving, with the switch, vehicle operation data representative of a vehicle state of the autonomous vehicle, wherein the switch is coupled to the array of sensors, the processing logic, and the control system, wherein the switch is configured to buffer the processing logic from the sensor data;
   selecting, with the switch, a first sensor group of the array of sensors of the autonomous vehicle based on the vehicle operation data; and
   based on selecting the first sensor group, prioritizing, by the switch, an order of transmission from the switch to the processing logic of the first sensor data over the second sensor data, the second sensor group being different from the first sensor group.

9. The method of claim 8, wherein transmission of the first sensor data and the second sensor data is from the switch to the processing logic of the autonomous vehicle.

10. The method of claim 9 further comprising:
    generating, with the processing logic, an external environment representation of the autonomous vehicle with the first sensor data and without the second sensor data.

11. The method of claim 10 further comprising:
    generating an updated external environment representation of the autonomous vehicle with the second sensor data, wherein the updated external environment representation of the autonomous vehicle is generated subsequently to the external environment representation.

12. The method of claim 8, wherein the vehicle state indicates a transmission gear of a transmission of the autonomous vehicle.

13. The method of claim 12, wherein the vehicle operation data is received from a vehicle data bus of the autonomous vehicle.

14. The method of claim 8, wherein the array of sensors includes rear sensors disposed to detect a rear-ward area of the autonomous vehicle and front sensors disposed to detect a frontside area of the autonomous vehicle, and wherein the vehicle operation data indicates a rear-ward direction of the autonomous vehicle, and further wherein the first sensor data is generated by the rear sensors and the second sensor data is generated by the front sensors.

15. The method of claim 8, wherein the array of sensors includes rear sensors disposed to detect a rear-ward area of the autonomous vehicle and front sensors disposed to detect a frontside area of the autonomous vehicle, and wherein the vehicle operation data indicates a forward direction of the autonomous vehicle, and further wherein the first sensor data is generated by the front sensors and the second sensor data is generated by the rear sensors.

16. The method of claim 8, wherein the vehicle operation data includes the speed of the autonomous vehicle.

17. The method of claim 8, wherein the array of sensors includes at least one of a LIDAR sensor, an ultrasonic sensor, a camera, or a RADAR sensor.

18. A system for an autonomous vehicle comprising:
a control system configured to determine a direction and a speed of the autonomous vehicle based on operation instructions;
processing logic configured to receive sensor data and generate the operation instructions based on the sensor data, wherein the sensor data is received from an array of sensors configured to capture one or more objects in an external environment of the autonomous vehicle; and
a switch coupled to the array of sensors, the processing logic, and the control system, wherein the switch is configured to buffer the processing logic from the sensor data, wherein the switch is configured to provide the operation instructions from the processing logic to the control system, wherein the switch is configured to receive the sensor data from the array of sensors, wherein the sensor data includes first sensor data from a first sensor group of the array of sensors and second sensor data from a second sensor group of the array of sensors, wherein the switch is configured to prioritize an order of transmission, from the switch to the processing logic, of the first sensor data over the second sensor data, and wherein the order of transmission of the first sensor data and the second sensor data is prioritized based on vehicle operation data received by the switch.

19. The system of claim 18, wherein the switch includes an input port configured to receive the vehicle operation data from a vehicle bus of the autonomous vehicle.

20. The system of claim 18, wherein the vehicle operation data includes the speed of the autonomous vehicle.

\* \* \* \* \*